Feb. 27, 1962     I. ABRAMS     3,022,795
PNEUMATIC PRESSURE CONTROL DEVICE
FOR INFLATABLE TIRE ELEMENTS
Filed Oct. 31, 1958
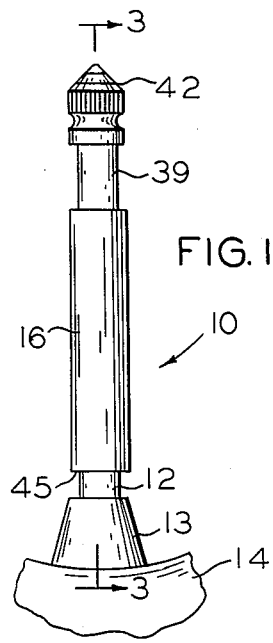
FIG. 1
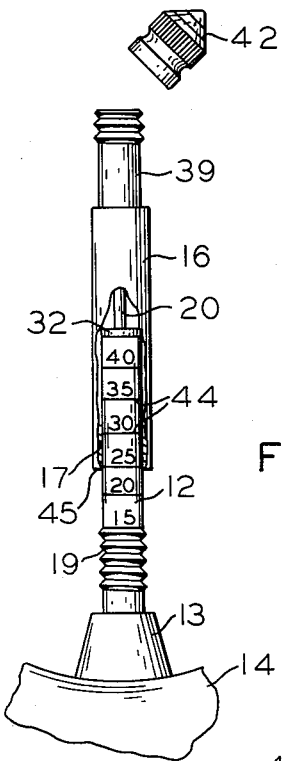
FIG. 2
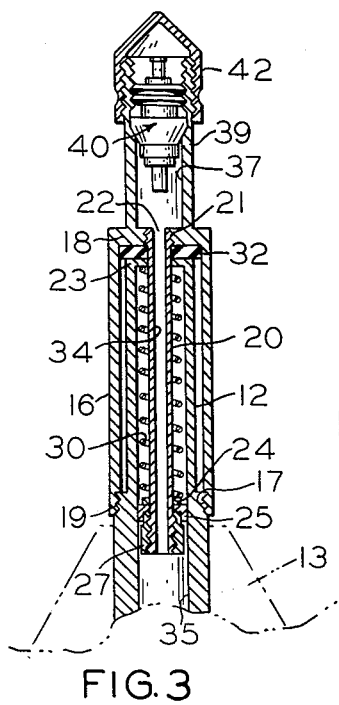
FIG. 3
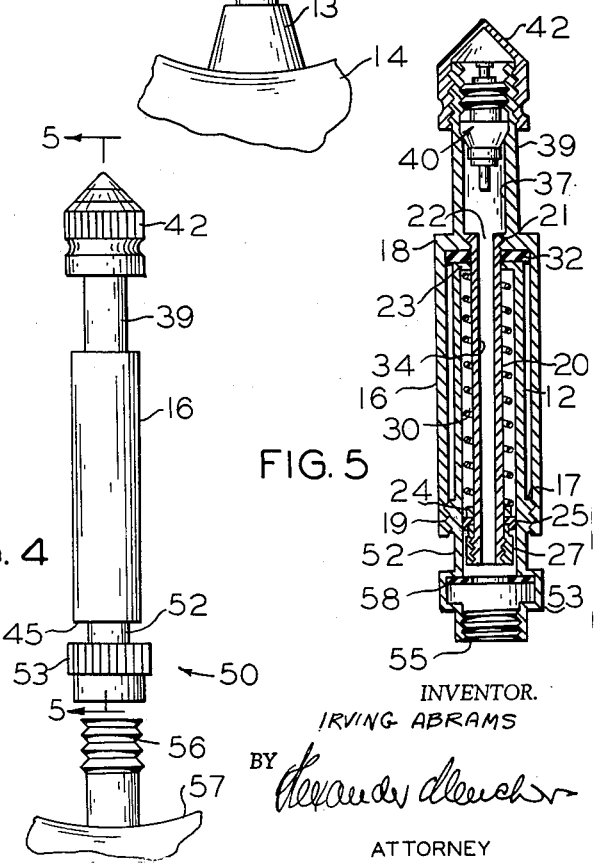
FIG. 4
FIG. 5
INVENTOR.
IRVING ABRAMS
BY
ATTORNEY

United States Patent Office 3,022,795
Patented Feb. 27, 1962

3,022,795
PNEUMATIC PRESSURE CONTROL DEVICE FOR INFLATABLE TIRE ELEMENTS
Irving Abrams, 30—100 51st St., Woodside, N.Y.
Filed Oct. 31, 1958, Ser. No. 771,047
5 Claims. (Cl. 137—227)

This invention relates to pneumatic pressure control apparatus and more particularly to a combination valve and gauge for inflatable tire elements.

Ordinarily, it is necessary to alternately supply pressurized air to the valve stem of an inflatable automobile tube or tire and check the pressure of the air therewithin during any inflation operation. Such not only increases the time required to properly inflate the tire element, but also reduces the chance of obtaining an accurate reading of the amount of pressure within the tire element. Furthermore, such pneumatic pressure gauges are not usually conveniently located so that the service station attendant must often rely upon the less accurate pressure gauge associated with the air supply hose used to inflate such tire elements. It is therefore an object of the present invention to provide a completely self contained combination pneumatic pressure valve and pneumatic pressure gauge for all types of tube and tubeless tire elements that is extremely simple in constructcion, efficient in operation, and which will overcome the aforementioned difficulties.

Another object of the present invention is to provide a combination pressure gauge and check valve assembly for inflatable tire elements which will automatically provide an instantaneous reading of the magnitude of the air pressure within the tire element so that all of the tires of the vehicle can be conveniently and accurately checked at any time.

An additional object of the present invention is to provide a combination pneumatic pressure gauge and valve assembly that is integrally constructed with the stem of the tire element so as to form a permanent and integral part thereof.

Still an additional object of the present invention is to provide a completely self contained combination pneumatic pressure gauge and valve assembly that can be readily installed on all existing inflatable tire elements and which can be readily detached therefrom for any purpose during the life of the unit and the life of the tire element.

A further object of the present invention is to provide a detachable combination pneumatic pressure gauge and valve assembly of the above type which may be readily removed for attachment to a replacement tire element after the original tire element has been disposed of.

All of the foregoing and still further objects and advantages of this invention will become apparent from a study of the following specification, taken in connection with the accompanying drawing, wherein:

FIGURE 1 is a fragmentary side elevational view of a combined pneumatic pressure gauge and valve assembly made in accordance with one form of the present invention in which it forms an integral part of an inflatable tire element, and shown in a completely closed position;

FIGURE 2 is a view similar to FIGURE 1, with parts broken away, of the assembly in an open operative position providing an indication of the magnitude of the pneumatic pressure within the tire element;

FIGURE 3 is a longitudinal cross sectional view taken along line 3—3 of FIGURE 1;

FIGURE 4 is a side elevational view of a slightly modified form of construction in which the assembly is selectively detachable from the stem portion of the inflatable tire element; and FIGURE 5 is a longitudinal cross sectional view taken along line 5—5 of FIGURE 4.

Referring now more in detail to the drawing, and more particularly to FIGURES 1 to 3 thereof, a combined pneumatic pressure gauge and valve assembly 10 made in accordance with one form of the present invention is shown to include a base member 12 integrally connected to the stem 13 of an inflatable tire element 14, such as an inner tube or tubeless tire.

As is more clearly shown in FIGURE 3 of the drawing, a sleeve 16 is slidably supported at one inner end upon the opposite outer end of the base member 12 for reciprocating longitudinal movement relative thereto. The one inner end of this sleeve 16 is provided with integral threads 17 that are selectively threadedly engageable with male threads 19 adjacent to the one inner end of the base element 12 so as to selectively secure the sleeve and base member together in the completely closed position.

A plunger 20 having a central longitudinal bore 34 extending completely therethrough is secured, such as by threads 21 at one end to the end wall 18 at the outer end of the sleeve 16. The plunger 20 extends in concentrically spaced relationship through the center of the base member 12 for longitudinal movement with the sleeve 16 relative thereto. A stop washer 24 is integrally secured to the plunger 20 adjacent to the opposite inner end thereof and forms a seat for a flexible sealing washer 25 that is clamped thereagainst by means of a lock nut 27. This flexible washer 25 thus forms an effective seal that prevents the passage of air into the space between the plunger 20 and the base member 12, while the central bore 34 of the plunger provides for communication between the central bore 35 of the stem 13 of the inflatable tire element and a chamber 37 defined by an extension 39 of the sleeve 16.

A one way check valve assembly 40 of conventional construction, such as the valve assemblies used by most conventional tubes and tubeless tires, is secured within the extension 39 in communication with the chamber 37. A cap 42 threadedly carried by the outer end of the extension 39 normally provides an effective seal against the entry of foreign matter into the valve assembly 40 during use of the tire element.

A compression coil spring 30 encircles the depending plunger 20 within the space between the plunger 20 and the base member 12. One end of this spring 30 is seated upon the fixed washer 24, while the opposite end thereof abuts against the end wall 23 of the base member 12. This spring yieldably resists outward longitudinal movement of the sleeve 16 and plunger 20 relative to the base member 12, for purposes hereinafter more fully explained. A gasket 32 carried by the end wall 23 of the base member 12 slidably receives the plunger 20 for longitudinal movement therethrough and provides an airtight seal preventing the escape of any air passing through the space between the plunger 20 and base member 12 that might have been permitted to enter therein by the flexible sealing washer 25.

Ordinarily, in the absence of any air within the tire element 14, the coil spring 30 will maintain the sleeve 16 in the substantially closed position illustrated in FIGURES 1 and 3 of the drawing. However, the presence of a quantity of pressurized air within the tire element 14 will act against the connected together parts of the plunger 20, sleeve 16, and extension 39 to urge this assembly in an outward direction against the action of the spring 30. As a result, after the tire element 40 has been filled with air, such as by applying a pressurized air line to the valve assembly 40 thereof, the presence of such pressurized supply of air will exert a constant outward force upon the parts against the action of the spring 30. Therefore, by rotating the sleeve 16 to disengage the threaded elements 17, 19 acting between the sleeve 16 and base member 12, the sleeve 16 and connected plunger 20 will be permitted to move outwardly against the resistance of the spring 30 which exerts a determinable force equal and opposite to the force of the pressurized air within the tire element. By imprinting a suitable scale 44 upon the outside of the base member 12, the lower edge 45 of the sleeve 16 may be used to provide a measurement of this determinable force so as to provide a visual reading of the magnitude of the air pressure within the tire element. In the event that the reading indicates that the pressure is higher than that desired, the pressure can be relieved by depressing the stem of the valve assembly 40 in a well known manner, following which the lower edge 45 of the sleeve 16 will indicate the reduced pressure. After the tire element has been properly inflated, the sleeve 16 is returned to the normally closed position by rotating the internal threads 17 into threaded engagement with the threads 19 on the base member 12, as shown in FIGURES 1 and 3 of the drawing.

Reference is now made to FIGURES 4 and 5 of the drawing which illustrates a slightly modified form of construction in which all of the working parts are substantially identical to those hereinbefore described. However, in this assembly 50, the base member 52 does not form an integral part of the stem 56 of the tire element 57. However, the stem 52 is provided with an integral coupling element 53 having an internally threaded sleeve portion 55 that may be threadedly attached to the externally threaded stem 56 of the tire element whenever desired. A gasket 58 contained within the coupling 53 effectively prevents any loss of air pressure so that this unit may be attached to the tire element 57 as long as desired, even throughout the entire useful life of the tire element. It is to be noted that when this assembly 50 is attached to any tire element for such prolonged periods of time, it is preferable to remove the valve assembly from the stem 56 of such tire element, whereby the valve assembly 40 in the extension 39 may be used to effectively control the flow of air through the entire system. This will facilitate the removal of excessive air from the tire element during any deflation thereof. On the other hand, when this assembly 50 is used only temporarily, it is not necessary to remove such valve assembly from the stem 56 as the inflating air will readily pass through both valve assemblies and any air to be removed may be permitted to flow outwardly from the valve stem 56 by depressing the plunger thereof, in a well known manner.

Aside from the fact that the base member 12 of the embodiment illustrated in FIGURES 1 to 3 forms an integral part of the stem 13 of the tire element 14, whereas the base member 52 of the embodiment illustrated in FIGURES 4 and 5 is readily detachable from the stem 56 of the tire element 57, the remaining structural parts and method of operation of both embodiments is identically the same.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. Pneumatic pressure control apparatus comprising, in combination, a hollow base member having means at one end for communication with the interior of the stem of an inflatable tire element, a sleeve slidably supported at the inner end upon the opposite outer end of said base member, a pneumatic check valve secured within the opposite outer end of said sleeve opening inwardly to receive a pressurized stream of air therethrough and releasably blocking air flow outwardly from said sleeve, a plunger concentrically secured within said sleeve slidably received within said hollow base member, said plunger defining a central longitudinal bore communicating with the interior of said base member at one end and communicating with said check valve at the opposite end, a depression coil spring encircling said plunger seated at one end upon said one end of said plunger and having an opposite end acting against said bore member adjacent to said opposite end of said plunger, pressure measuring indicia imprinted upon the outside surface of said base member intermediate the ends thereof facing said sleeve, said sleeve and said plunger being responsive to pressurized air within said base member with said check valve blocking air flow outwardly from said sleeve to move outwardly upon said base member, the inner end of said sleeve being movable past said indicia imprinted upon said base member during said outward movement of said sleeve relative to said base member to determine the pressure of air within said base member, and screw threaded means acting between said inner end of said sleeve and said base member releasably securing said sleeve in a fixed position upon said base member against outward movement by pressurized air within the base member.

2. Pneumatic pressure control apparatus as set forth in claim 1, wherein said one end of said plunger includes sealing means blocking the passage of air between said plunger and said base member.

3. Pneumatic pressure control apparatus as set forth in claim 2, further comprising gasket means carried by said outer end of said base member slidably receiving said plunger therethrough and preventing the passage of air between said gasket and said plunger.

4. Pneumatic pressure control apparatus as set forth in claim 3, wherein said one end of said base member is formed integral with a tire valve stem.

5. Pneumatic pressure control apparatus as set forth in claim 3, wherein said one end of said base member includes a coupling for releasable engagement with a tire valve stem.

References Cited in the file of this patent
UNITED STATES PATENTS

| | | |
|---|---|---|
| 1,091,780 | Traub | Mar. 31, 1914 |
| 1,210,538 | Rose | Jan. 2, 1917 |
| 1,478,506 | Bromberg | Dec. 25, 1923 |
| 1,582,523 | Larson | Apr. 27, 1926 |